US010348097B2

(12) United States Patent
Shibata et al.

(10) Patent No.: US 10,348,097 B2
(45) Date of Patent: Jul. 9, 2019

(54) GENERATOR SYSTEM

(71) Applicant: Honda Motor Co., Ltd., Tokyo (JP)

(72) Inventors: Kenji Shibata, Wako (JP); Tetsuya Matsuhisa, Wako (JP); Wataru Matsuyama, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/936,374

(22) Filed: Mar. 26, 2018

(65) Prior Publication Data

US 2018/0287391 A1    Oct. 4, 2018

(30) Foreign Application Priority Data

Mar. 30, 2017  (JP) ................. 2017-066548

(51) Int. Cl.
| | |
|---|---|
| *H02J 3/40* | (2006.01) |
| *H02P 9/02* | (2006.01) |
| *H02K 19/34* | (2006.01) |
| *H02H 3/16* | (2006.01) |
| *H02P 9/00* | (2006.01) |
| *H02J 3/46* | (2006.01) |
| *H02P 27/06* | (2006.01) |
| *H02K 7/18* | (2006.01) |

(52) U.S. Cl.
CPC ............... *H02J 3/40* (2013.01); *H02H 3/16* (2013.01); *H02J 3/46* (2013.01); *H02K 19/34* (2013.01); *H02P 9/006* (2013.01); *H02P 9/02* (2013.01); *H02K 7/1815* (2013.01); *H02P 27/06* (2013.01)

(58) Field of Classification Search
CPC ...... H02J 3/40; H02J 3/46; H02P 9/02; H02K 19/34
See application file for complete search history.

(56) References Cited

U.S. PATENT DOCUMENTS

| | | | | |
|---|---|---|---|---|
| 2003/0025398 | A1* | 2/2003 | Nakamura | H02M 7/49 307/72 |
| 2012/0291739 | A1* | 11/2012 | Hashimoto | F02N 11/08 123/179.3 |
| 2012/0293004 | A1* | 11/2012 | Hashimoto | H02J 3/40 307/82 |

(Continued)

FOREIGN PATENT DOCUMENTS

JP         5839836 B2    1/2016

*Primary Examiner* — Sean Gugger
(74) *Attorney, Agent, or Firm* — Duft & Bornsen, PC (57) ABSTRACT

A generator system, including first and second generators, a connection circuit connecting output lines of the first and second generators to each other and connecting neutral lines of the first and second generators to the ground, a switch command unit outputting commands to switch a connection mode of the first and second generators between parallel and series connection modes, a circuit switch switching a connection mode of the connection circuit in response to the commands, a data acquiring unit acquiring a waveform data of the first generator when the second generator is operated after the first generator is operated, and a control unit controlling the second generator to synchronize frequency and phase of waveforms of the first and second generators in the parallel connection mode and controlling the second generator to synchronize frequency and shift phase by 180 degree in the series connection mode.

7 Claims, 7 Drawing Sheets (56) References Cited

U.S. PATENT DOCUMENTS

| | | | |
|---|---|---|---|
| 2012/0293140 A1* | 11/2012 | Hashimoto | H02P 25/22 322/94 |
| 2012/0294049 A1* | 11/2012 | Hashimoto | H02P 25/22 363/37 |
| 2012/0294050 A1* | 11/2012 | Hashimoto | F02D 29/06 363/37 |
| 2013/0293023 A1* | 11/2013 | Collie | H02J 3/46 307/84 |
| 2014/0008988 A1* | 1/2014 | Clarke | H02J 3/40 307/84 |
| 2015/0035286 A1* | 2/2015 | Stephens | B63H 21/22 290/4 A |
| 2018/0351366 A1* | 12/2018 | Handelsman | H02J 3/40 |
| 2019/0081582 A1* | 3/2019 | Rozman | H02M 5/4585 |

* cited by examiner

| | PRESENT EMBODIMENT | FIRST COMPARATIVE EXAMPLE | SECOND COMPARATIVE EXAMPLE |
|---|---|---|---|
| SERIES |  |  |  |
| PAR-ALLEL |  |  |  |

GENERATOR SYSTEM

CROSS-REFERENCE TO RELATED APPLICATION

This application is based upon and claims the benefit of priority from Japanese Patent Application No. 2017-066548 filed on Mar. 30, 2017, the content of which is incorporated herein by reference.

BACKGROUND OF THE INVENTION

Field of the Invention

This invention relates to a generator system which has alternating current power generators connected to each other.

Description of the Related Art

Equipment that obtains electric power by connecting multiple alternating current power generators (AC generators) in parallel is known. For example, in an arrangement described in Japanese Patent Publication No. 5839836 (JP5839836B) a master side generator and a slave side generator are interconnected through a power line and a signal line, and when the slave side generator generates power after the master side generator starts to generate power, a sensor of the slave side generator detects AC voltage output from the master side generator. Then an FET of an inverter unit of the slave side generator is on-off controlled to match the detected voltages and phases and perform parallel synchronized operation.

In this connection, when multiple AC generators are to be operated in parallel and in series, the situation is that the generators are interconnected in a condition with the neutral conductors of the individual generators grounded. However, when the neutral conductors of the generators are grounded, both parallel and series operation of the multiple AC generators is difficult to achieve.

SUMMARY OF THE INVENTION

An aspect of the present invention is a generator system, including: a first generator and a second generator each having an inverter circuit configured to output alternating current; a connection circuit configured to connect an output line for supplying electric power from the first generator and an output line for supplying electric power from the second generator to each other, and configured to connect a neutral line of the first generator and a neutral line of the second generator to the ground; a switch command unit configured to output a parallel connection command to switch a connection mode of the first generator and the second generator to a parallel connection mode, and configured to output a series connection command to switch the connection mode to a series connection mode; a circuit switch configured to switch a connection mode of the connection circuit to a first connection mode in which the first generator and the second generator are connected in the parallel connection mode when the parallel connection command is output by the switch command unit, and configured to switch the connection mode of the connection circuit to a second connection mode in which the first generator and the second generator are connected in the series connection mode when the series connection command is output by the switch command unit; a data acquiring unit configured to acquire a waveform data of alternating current voltage from the inverter circuit of the first generator when the second generator is operated after the first generator is operated; and a control unit configured to control operation of the inverter circuit of the second generator to synchronize a frequency and a phase of a waveform data of alternating current voltage from the inverter circuit of the second generator and the waveform data acquired by the data acquiring unit when the parallel connection command is output by the switch command unit, and configured to control operation of the inverter circuit of the second generator to synchronize the frequency and shift the phase by 180 degree when the series connection command is output by the switch command unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
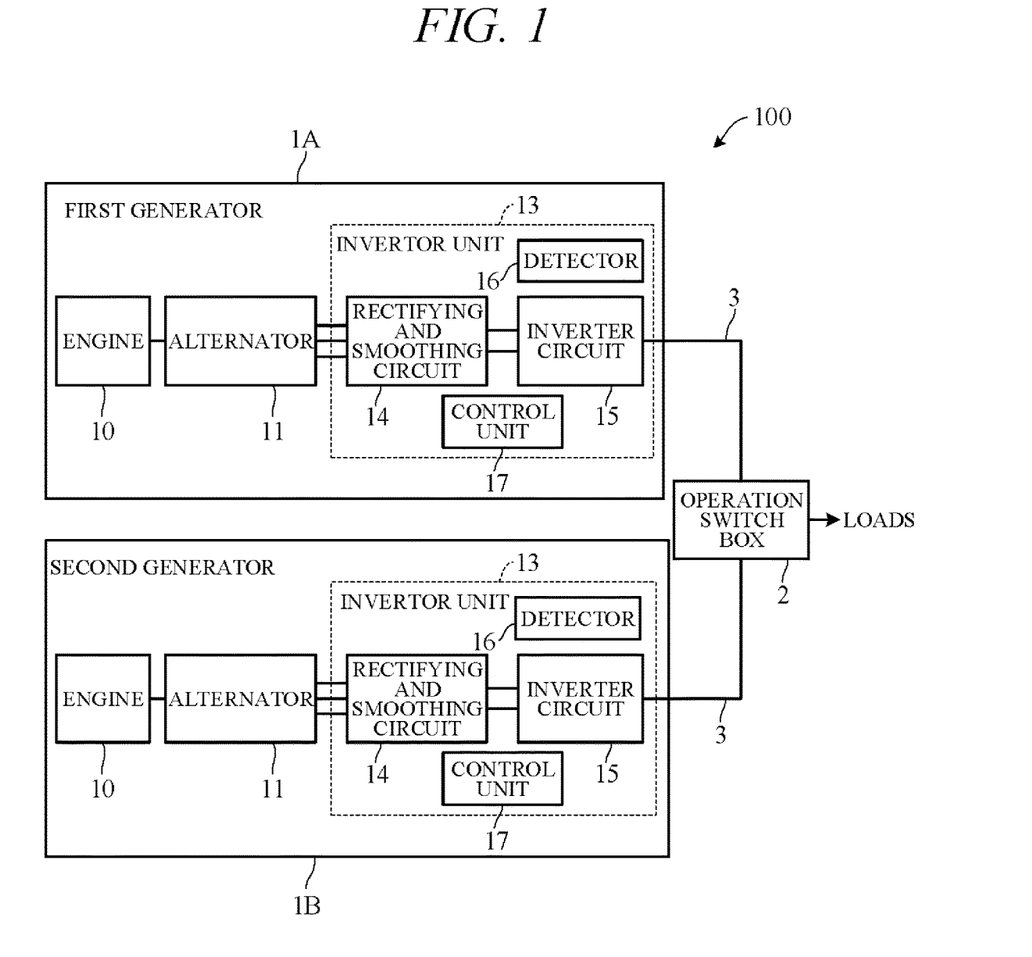
FIG. 1 is a diagram schematically illustrating an overall configuration of a power generator system according to an embodiment of the present invention.

An embodiment of the present invention is explained with reference to FIGS. 1 to 7 in the following. FIG. 1 is a diagram schematically illustrating the overall configuration of an electric power generator system 100 according to an embodiment of the present invention. This power generation system comprises a first generator 1A, a second generator 1B, and an operation switch box 2 that connects the first generator 1A and second generator 1B to enable parallel operation or enable series operation. The first generator 1A and second generator 1B are portable or mobile generators of weight and size a user can carry by hand. The power generator system 100 is not limited two interconnected generators but can instead comprise three or more interconnected generators.

The first generator 1A and second generator 1B are, for example, identical specification alternating current power generators (AC generators) having a rated voltage of 120V and identical structures. Specifically, as shown in FIG. 1, the generators 1A and 1B each comprises a general purpose engine 10, an alternator 11 driven by the engine 10, and an inverter unit 13 for converting and outputting electric power generated by the alternator 11. The generators 1A and 1B can be of a rated voltage other than 120V, such as 100V, for example.

The engine 10 is, for example, a spark ignition, air cooled, gasoline fueled engine with a piston that reciprocates inside a cylinder and a crankshaft that rotates synchronously with the piston. Motive power of the engine 10 is output through the crankshaft to the alternator 11. The engine 10 can be started, for example, by operating an unshown recoil starter connected to the crankshaft. Optionally, the engine 10 can be other than a gasoline engine and the alternator 11 can be driven using a different arrangement from that described in the foregoing.

The alternator (generator main unit) 11 is a multipolar alternator driven by the engine 10 to generate AC power. It comprises a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. The alternator 11 can be driven as a starter motor by power from a battery (not shown), in which case the engine 10 can be started without using the recoil starter.

The inverter unit 13 comprises a rectifying and smoothing circuit 14 for rectifying and smoothing three-phase AC current output by the alternator 11, an inverter circuit 15 for converting DC current output from the rectifying and smoothing circuit 14 to AC current, a detector 16 for detecting voltage value and amperage value of AC current output from the inverter circuit 15, and a control unit 17 for controlling switching operation of the inverter circuit 15. The detector 16 comprises a voltage sensor and an ampere sensor. The control unit 17 is constituted as a microcomputer including an arithmetic processing unit comprising a CPU, ROM, RAM and other peripheral circuits and the like.

The rectifying and smoothing circuit 14 comprises rectifying circuits and capacitor or other type smoothing circuits associated one with each of the U-phase, V-phase and W-phase windings of the alternator 11. The inverter circuit 15 is configured as an H-bridge circuit, for example, and comprises multiple switching elements using MOSFET, IGBT or other transistors, and diodes connected in parallel with the switching elements. The switching elements are turned ON and OFF by control signals output by the control unit 17 so as to convert DC current to AC current. The obtained AC current is sinusoidally modulated by passage through an unshown filter circuit that is part of the inverter circuit 15 and transmitted through a cable 3 to the operation switch box 2.

The operation switch box 2 is configured to enable connection mode switching, i.e., connection circuit switching, of the power lines of the generators 1A and 1B. The connection circuit switching in the operation switch box 2 enables the two generators 1A and 1B to be connected in parallel to obtain an output voltage of 120V or to be connected in series to obtain an output voltage of 240V. When the generators 1A and 1B are parallel- or series-connected in this manner, the neutral conductors of the generators 1A and 1B are sometimes required to be grounded owing to regulatory or safety reasons, for example. In the present embodiment, the operation switch box 2 is therefore configured as set out below so that 120V and 240V output voltages can be selectively obtained in a state with the neutral conductors of the generators 1A and 1B grounded.

Figure 2:
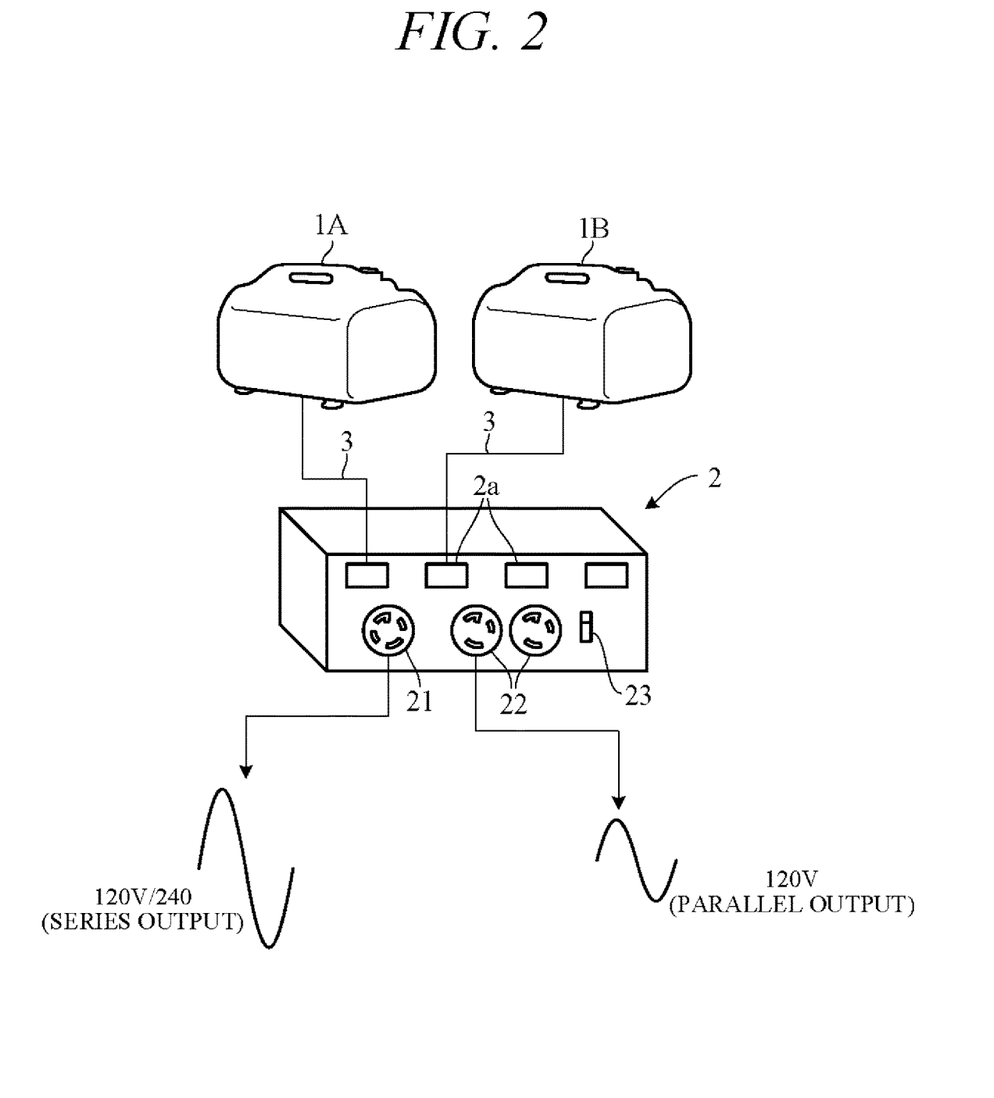
FIG. 2 is a perspective diagram showing an outer shape of an operation switch box in the power generator system of FIG. 1.

FIG. 2 is a perspective diagram showing the shape of the operation switch box 2 as seen from outside. As seen in FIG. 2, the operation switch box 2 has an overall box-like shape and comprises multiple connectors 2a to which the cables 3 of the generators 1A and 1B are connected. The operation switch box 2 illustrated in FIG. 2 is provided with four connectors 2a and can have up to four generators connected thereto. The operation switch box 2 is equipped with sockets 21 and 22 for connecting loads (electrical loads) and a switch command unit 23 operated by a user to output a command to switch between parallel connection and series connection. Optionally, the switch command unit 23 can be provided on the side of the generators 1A and 1B. The socket 21 is a socket for 120V and 240V use during series connection, and the sockets 22 are sockets for 120V use during parallel connection.

Figure 3:
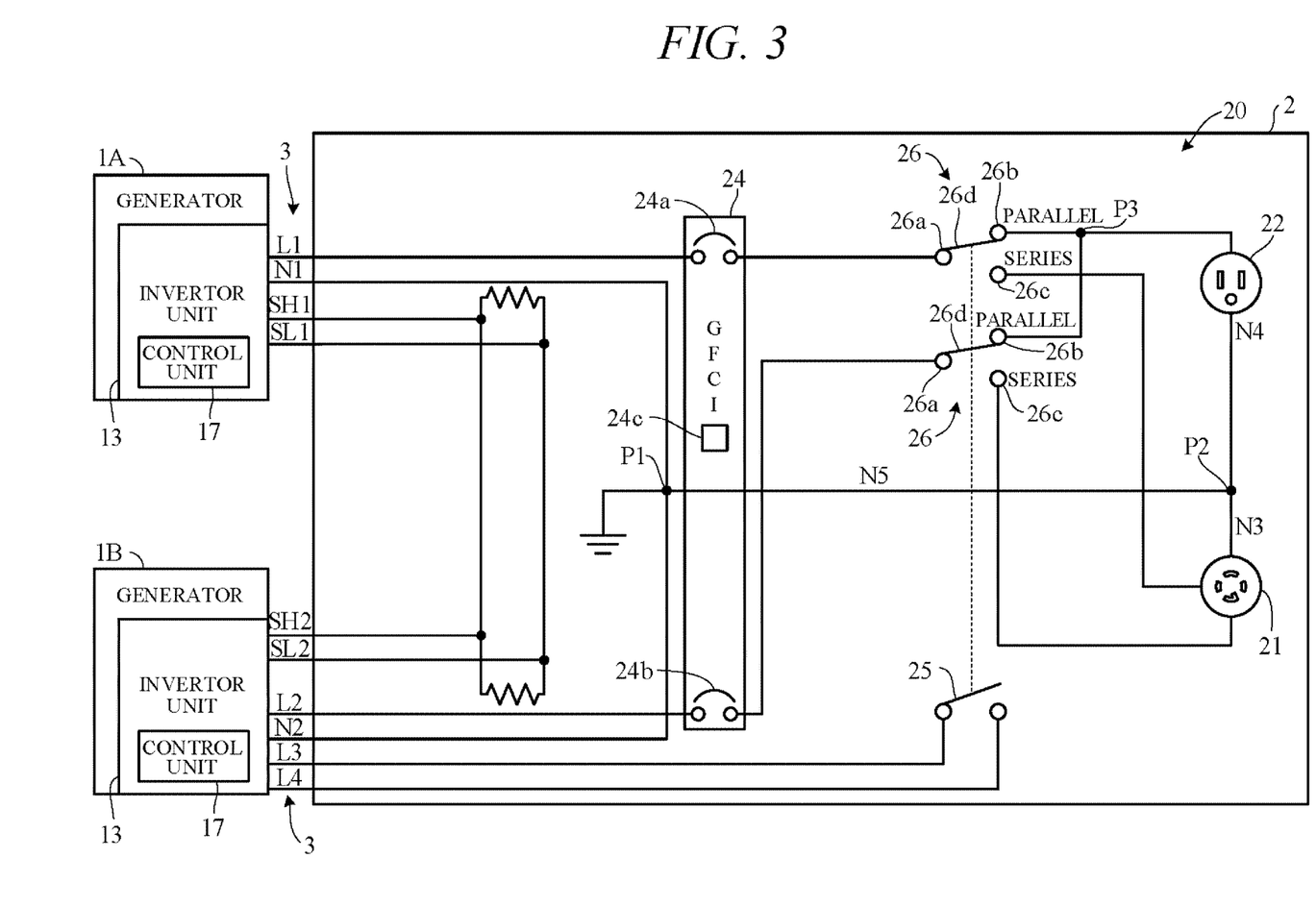
FIG. 3 is an electrical circuit diagram showing essential components inside the operation switch box in the power generator system of FIG. 1.

FIG. 3 is an electrical circuit diagram showing essential components inside the operation switch box 2. As shown in FIG. 3, the inverter unit 13 of the first generator 1A is connected to the operation switch box 2 through a pair of power lines L1 and N1 and a pair of communication lines (signal lines) SH1 and SL1 contained in the associated cable 3. The inverter unit 13 of the second generator 1B is connected to the operation switch box 2 through a pair of power lines L2 and N2 and a pair of communication lines SH2 and SL2 contained in the associated cable 3. In addition, a phase switching switch 25 is connected to the inverter unit 13 of the second generator 1B through a pair of signal lines L3 and L4. A predetermined voltage (e.g., 5V) is applied to the signal line L3 and the signal line L4 is grounded.

The power lines L1 and L2 are power lines passing current output from the generators 1A and 1B, and the power lines N1 and N2 are neutral lines. The neutral lines N1 and N2 are connected together at junction P1 to be ground in common. The operation switch box 2 comprises a GFCI (Ground-Fault Circuit Interrupter) 24 that functions as a leakage current breaker, the phase switching switch 25, a pair of series-parallel switching switches 26 for switching an electrical circuit 20 between series connection and parallel connection, and the sockets 21 and 22 (FIG. 2) inside the operation switch box.

The neutral lines N3 and N4 of the sockets 21 and 22 join at junction P2, from where, after passing via a neutral line N5 that runs through the GFCI 24, are grounded via the junction P1. The power lines L1 and L2 are connected to the sockets 21 and 22 through the GFCI 24 and the series-parallel switching switches 26. The GFCI 24 comprises a ground fault detector 24c for detecting ground fault current and switch members 24a and 24b for breaking continuity of lines L1 and L2, and upon detection of ground fault current by the ground fault detector 24c, opens the switch members 24a and 24b to interrupt flow of current through lines L1 and L2, thereby preventing supply of power to the sockets 21 and 22. The ground fault detector 24c detects ground fault current from difference between supply current and return current, e.g., by a principle similar to that of a zero phase current transformer (ZCT).

Each of the pair of series-parallel switching switches 26 comprises a common contact 26a connected to one of the power lines L1 and L2, and a movable contact 26d whose one end is connected to the associated common contact 26a and whose other end switchably connects to either a parallel contact 26b or a series contact 26c. The parallel contacts 26b are connected to a junction P3 and from there to the sockets 22 (only one shown). In other words, the parallel contacts 26b are connected to the sockets 22 in parallel connection. On the other hand, the series contacts 26c are connected to the socket 21 in series.

The series-parallel switching switches 26 are switched by user operation of the switch command unit 23 (FIG. 2). Specifically, when the switch command unit 23 is operated to select parallel connection, the movable contacts 26d are switched to parallel connection, whereby the common contacts 26a and parallel contacts 26b are connected and the power lines L1 and L2 are connected in parallel. This enables 120V output from the sockets 22. On the other hand, when the switch command unit 23 is operated to select series connection, the movable contacts 26d are switched to series connection, whereby the common contacts 26a and the series contacts 26c are connected and the power lines L1 and L2 are connected in series. This enables 240V output from the socket 21.

The phase switching switch 25 switches in linked operation with the series-parallel switching switches 26. Namely, when the series-parallel switching switches 26 are switched to parallel position, the phase switching switch 25 is OFF (open), and when the series-parallel switching switches 26 are switched to series position, the phase switching switch 25 is ON (closed). The inverter unit 13 of the generator 1B is sent a high signal when the phase switching switch 25 is OFF and a low signal when it is ON, and the control unit 17 of the generator 1B detects whether the phase switching switch 25 is ON or OFF from these signals.

The communication lines SH1, SL1, SH2 and SL2 are configured as a CAN bus, and the communication lines SH1, SH2 and the communication lines SL1, SL2 are connected through terminators. The control units 17 of the generators 1A and 1B are intercommunicatively connected through the communication lines SH1, SH2, SL1 and SL2.

In the present embodiment, when operation of the first generator 1A and the second generator 1B is coordinated, the second generator 1B goes into operation after the first generator 1A. The first generator 1A therefore serves as a master generator and the second generator 1B as a slave generator, and operation of the second generator 1B is controlled to synchronize with operation of the first generator 1A.

Figure 4:
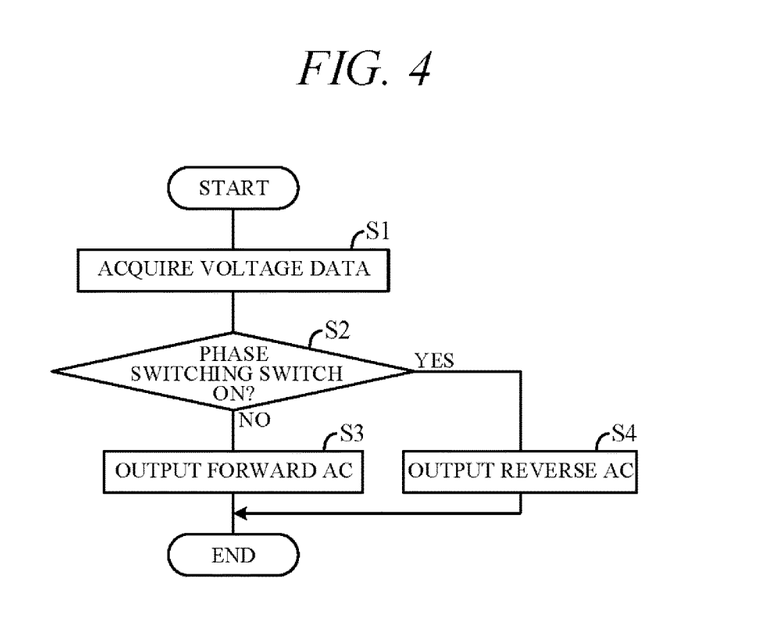
FIG. 4 is a flowchart showing an example of processing performed by a control unit of a second generator in the power generator system of FIG. 1.

FIG. 4 is a flowchart showing an example of processing performed by the control unit 17 of the second generator 1B. The processing indicated by this flowchart is commenced when, after the first generator 1A and the second generator 1B are connected via the operation switch box 2, the second generator (slave generator) 1B is started following starting of the first generator (master generator) 1A. Specifically, when the detector 16 of the second generator 1B detects output voltage of the first generator 1A applied through lines L1 and L2, or when the control unit 17 of the second generator 1B receives voltage data transmitted from the first generator 1A, the processing is commenced and repeated at regular time intervals.

First, in S1 (S: processing Step), data on AC voltage output from the inverter circuit 15 of the first generator 1A is acquired, i.e., waveform data (in forward phase) indicating AC voltage change over time is acquired. These voltage data are acquired by, for example, reading output voltage of the first generator 1A detected by the detector 16 of the second generator 1B or receiving waveform data transmitted from the first generator 1A. Next, in S2, whether the phase switching switch 25 is ON (outputs low signal) is determined based on signals from the signal lines L3 and L4.

When the result in S2 is NO, i.e., when parallel connection of the generators 1A and 1B is determined, the program goes to S3.

In S3, control signals are output to the inverter circuit 15 so as to bring the phase and frequency of the waveform of the AC voltage output from the second generator 1B into coincidence with those of the AC voltage waveform output from the first generator 1A that was read in S1. Specifically, in order to synchronize single phase AC output from the second generator 1B with single phase AC output from the first generator 1A, a control signal is output to the inverter circuit 15 based on AC current zero crossing time of the first generator 1A detected by the detector 16 of the second generator 1B, and ON-OFF of the switching elements is controlled accordingly. As a result, the second generator 1B outputs forward single phase AC that is phase- and frequency-matched to that of the first generator 1A.

On the other hand, when the result in S2 is YES, i.e., when series connection of the generators 1A and 1B is determined, the program goes to S4. In S4, in order to phase-shift the waveform of AC voltage output from the second generator 1B by 180° relative to the waveform of AC voltage output from the first generator 1A that was read in S1 (so as to synchronize with phase shifted 180°), control signals are output to the inverter circuit 15 based on zero crossing time of the AC voltage of the first generator 1A received via the communication lines SH1, SL1, SH2 and SL2 and ON-OFF of the switching elements is controlled accordingly. As a result, the second generator 1B outputs single phase AC reverse in phase from that of the first generator 1A.

Regardless of whether the first generator 1A and second generator 1B are in parallel operation or in series operation, their control units 17 collect current data and voltage data on their associated generators 1A and 1B, and the control units 17 constantly exchange these data through the communication lines SH1, SL1, SH2 and SL2. So when the output of one of the generators 1A and 1B is smaller than that of the other, current unbalance, cross-current and the like can be inhibited by controlling operation of the switching elements of the inverter circuits 15 so as to correct voltage amplitude and voltage phase level.

Figure 5:
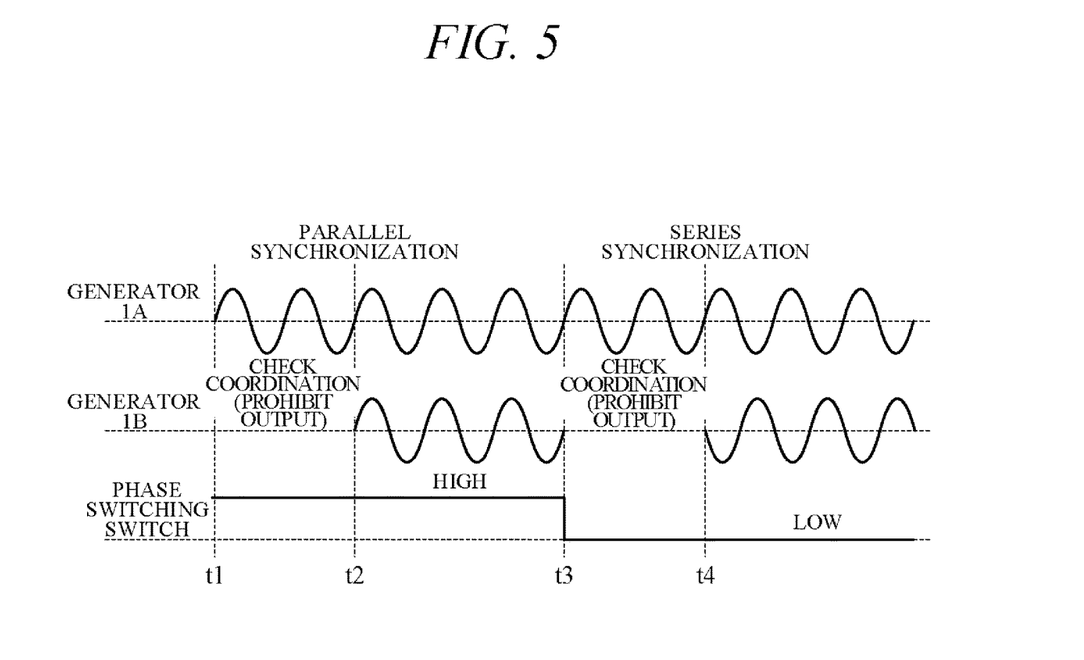
FIG. 5 is a diagram showing an example of voltage waveforms output from two generators in the power generator system of FIG. 1.

FIG. 5 is a diagram showing an example of voltage waveforms output from the first generator (master generator) 1A and the second generator (slave generator) 1B, namely, an example in a case where the second generator 1B went into operation after the first generator 1A went into operation. When the phase switching switch 25 is determined to be OFF (high signal) at time t1 in FIG. 5, the control unit 17 of the second generator 1B begins parallel connection sync processing (S3). In this case, the control unit 17 checks coordination with the first generator 1A and prohibits output of AC from the second generator 1B during the coordination check (time t1 to t2).

In a first aspect of the coordination check, the control units 17 of the generators 1A and 1B communicate to exchange their respective data on nominal voltage (e.g., 120V) and frequency (e.g., 50 Hz or 60 Hz) and determine whether these match. When they match, the control unit 17 of the second generator 1B acquires voltage data of the first generator 1A and commences sync processing, and once synchronization is established, initiates output of forward-phase AC from the second generator 1B (time t2). As output from the second generator 1B is prohibited during the coordination check in this manner, generator 1A and 1B output collision is prevented.

When the phase switching switch 25 is determined to be switched ON at time t3 in FIG. 5, the control unit 17 of the second generator 1B begins series connection sync processing (S4). In this case, too, the control unit 17 of the second generator 1B checks coordination with the first generator 1A and prohibits output of AC from the second generator 1B during the coordination check. At termination of the coordination check, i.e., once synchronization of the generators 1A and 1B is established, the control unit 17 initiates output of reverse-phase AC from the second generator 1B (time t4).

The present embodiment can achieve advantages and effects such as the following:

(1) The power generator system 100 includes the first generator 1A and the second generator 1B each having one of the inverter circuits 15 for outputting AC; the electrical circuit 20 adapted to interconnect line L1 of the first generator 1A and line L2 of the second generator 1B and ground neutral line N1 of the first generator 1A and neutral line N2 of the second generator 1B; the switch command unit 23 for outputting command to switch between parallel connection and series connection of the first generator 1A and the second generator 1B; the series-parallel switching switches 26 responsive to commands from the switch command unit 23 for switching the electrical circuit 20 to connect the first generator 1A and the second generator 1B in parallel or series; the detector 16 for detecting waveform data of AC voltage output from the inverter circuit 15 of the first generator 1A when the second generator 1B goes into operation after the first generator 1A went into operation; and the control unit 17 for controlling operation (switching operation) of the inverter circuit 15 of the second generator 1B in response to a parallel connection command from the switch command unit 23 so as to bring phase and frequency of waveform data of AC voltage output from the inverter circuit 15 of the second generator 1B into coincidence with those of waveform data of the first generator 1A detected by the detector 16, and in response to a series connection command from the switch command unit 23 so as to bring frequency of waveform data of AC voltage output from the inverter circuit 15 of the second generator 1B into coincidence with, and shift phase thereof by 180° from, those of waveform data of the first generator 1A detected by the detector 16 (FIGS. 1 to 3).

Owing to this configuration, a voltage of 120V when the generators 1A and 1B are connected in parallel or a voltage of 240V when they are connected in series can be selectively obtained with neutral lines N1 and N2 of the generators 1A and 1B grounded. A more detailed explanation of this point follows.

Figure 6A:
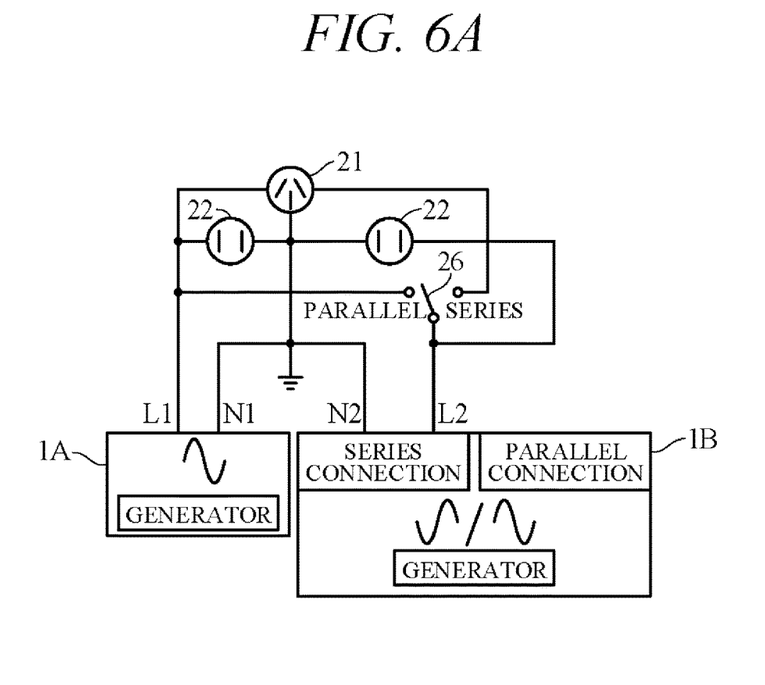
FIG. 6A is an electrical circuit diagram schematically illustrating a connection mode of the two generators in the power generator system of FIG. 1.
Figure 6B:
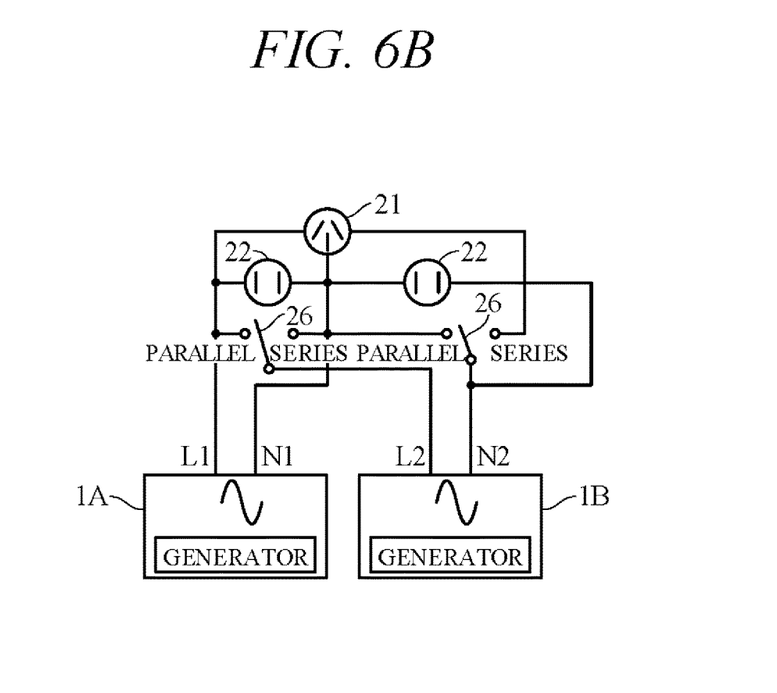
FIG. 6B is a diagram showing a first comparative example with respect to that of FIG. 6A.
Figure 6C:
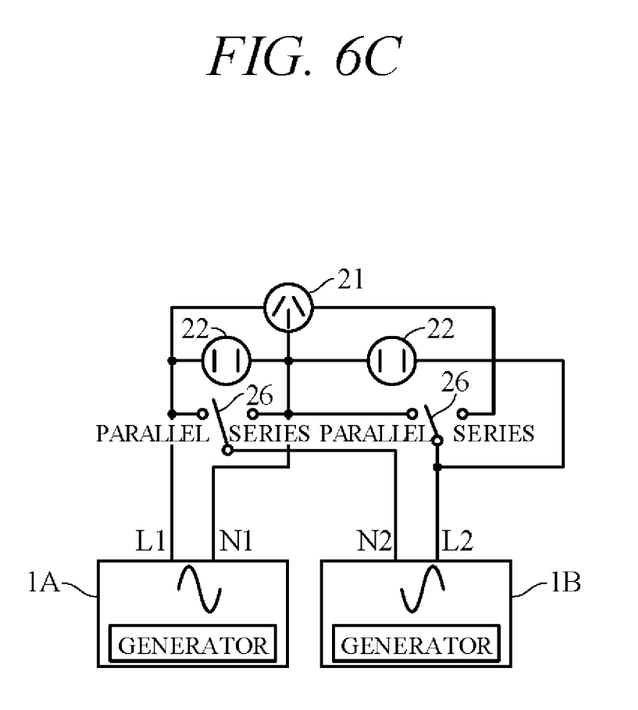
FIG. 6C is a diagram showing a second comparative example with respect to that of FIG. 6A.

FIG. 6A is an electrical circuit diagram schematically illustrating a connection mode of the two generators 1A and 1B in the power generator system 100 according to the present embodiment. This electrical circuit is substantially the same as that shown in FIG. 3 and members in common with those of FIG. 3 are assigned like reference symbols. In FIG. 6A, similarly to in FIG. 3, neutral lines N1 and N2 of the generators 1A and 1B are jointly grounded. On the other hand, the series-parallel switching switches 26 are consolidated in a single unit. FIGS. 6B and 6C show first and second comparative examples with respect to that of FIG. 6A. The first comparative example is one in which the second generator 1B outputs forward-phase voltage when the first generator 1A outputs forward-phase voltage, irrespective of whether in series connection or in parallel connection, and the second comparative example is one in which the second generator 1B outputs reverse-phase voltage when the first generator 1A outputs forward-phase voltage, irrespective of whether in series connection or in parallel connection.

Figure 7:
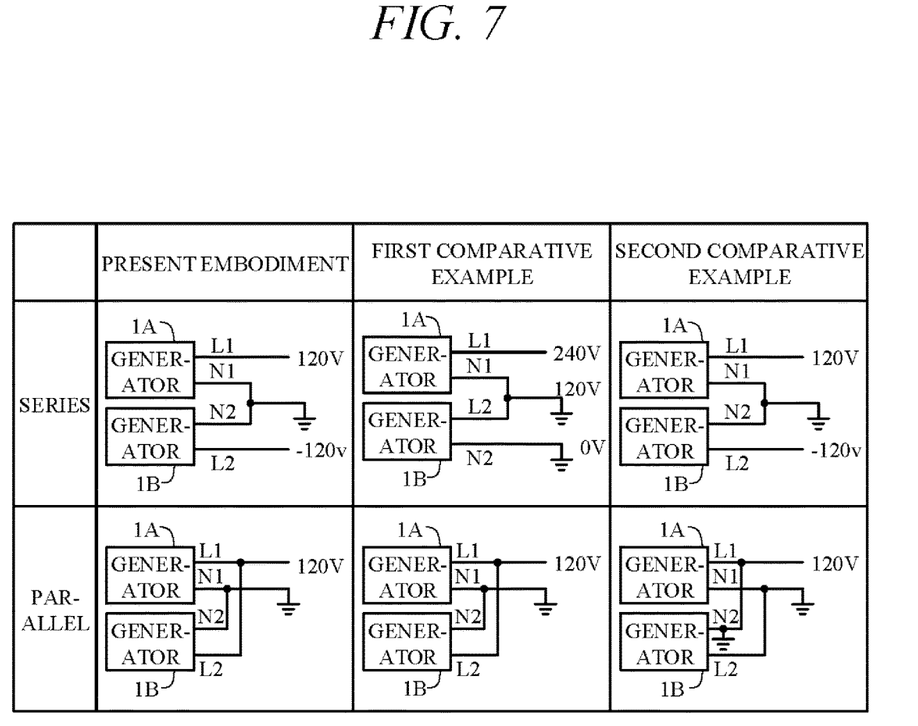
FIG. 7 is a diagram schematically illustrating wiring patterns that arise during series connection and during parallel connection for each of electrical circuit diagrams of FIG. 6A, FIG. 6B and FIG. 6C.

FIG. 7 is a diagram schematically illustrating, for each of the present embodiment (FIG. 6A), the first comparative example (FIG. 6B) and the second comparative example (FIG. 6C), the wiring patterns that arise during series connection and during parallel connection established in response to switching by the series-parallel switching switches 26. In the present embodiment, the phases of AC output by the generators 1A and 1B during series connection are mutually opposite. Consequently, as shown in FIG. 7, a potential difference of 240V occurs between lines L1 and L2 via neutral lines N1 and N2, whereby the generators 1A and 1B can produce an overall output voltage of 240V. In contrast, during parallel connection, the generators 1A and 1B both output forward-phase AC, so that output voltage of 120V relative to neutral lines N1 and N2 can be produced on each of lines L1 and L2.

Contrary to this, in the first comparative example, 120V can be output during parallel connection, but 240V cannot be output because series connection causes shorting between neutral wire N1 of the first generator 1A and line L2 of the second generator 1B. Further, in the second comparative example, 240V can be output during series connection, but 120V cannot be output because parallel connection causes shorting between line L1 of the first generator 1A and neutral line N2 of the second generator 1B and between line L2 of the second generator 1B and neutral line N1 of the first generator 1A. That is to say, in the first comparative example and the second comparative example, shorting occurs during parallel connection or during series connection because neutral lines N1 and N2 cannot be established in common.

(2) The electrical circuit 20 of the operation switch box 2 comprises the GFCI 24 (FIG. 3). The GFCI 24 comprises the ground fault detector 24c for detecting ground fault current, and the switch members 24a and 24b (power interruption members) for breaking continuity of lines L1 and L2 (conducting paths) from the first generator 1A and second generator 1B to the sockets 21 and 22 upon detection of ground fault current by the ground fault detector 24c (FIG. 3). As a result, ground fault (ground leakage) can be prevented, so that multiple generators 1A, 1B can be mutually coordinated in series operation and parallel operation at a construction site, for example, while keeping neutral lines N1, N2 of the multiple generators 1A, 1B grounded.

(3) Neutral line N1 of the first generator 1A and neutral line N2 of the second generator 1B are connected together and grounded (FIG. 3). Application to the GFCI 24 requiring grounding as a prerequisite is therefore easily realized with no risk of shorting between neutral lines N1 and N2 and lines L1 and L2 in either parallel connection or series connection.

(4) Line L1 and neutral line N1 of the first generator 1A and line L2 and neutral line N2 of the second generator 1B are connected to the operation switch box 2 (FIG. 1). The operation switch box 2 comprises the electrical circuit 20 for switching between series connection and parallel connection, and further comprises the sockets 22 for electrical load connection during parallel connection and the socket 21 for electrical load connection during series connection (FIGS. 2 and 3). Owing to the provision of the operation switch box 2 in this manner, switching of the generators 1A and 1B between series connection and parallel connection, and connection of electrical loads can be easily performed.

Although the aforesaid embodiment is adapted to switch the electrical circuit 20 between parallel connection and series connection by switching the pair of series-parallel switching switches 26 serving as a circuit switching unit, the configuration of the connection circuit for connecting multiple generators is not limited to that described in the foregoing. Although the aforesaid embodiment is adapted to acquire waveform data of the generators 1A and 1B during output synchronization by detecting AC voltage waveform data with the detector 16 or by receiving waveform data through the communication lines SH1, SL1, SH2 and SL2, the configuration of the data acquisition unit is not limited to that described in the foregoing. Although the aforesaid embodiment is adapted to define the first generator 1A as master and the second generator 1B as slave and to synchronize output of the slave with output of the master, the control unit can be of any configuration insofar as it controls operation of the inverter circuit so that phases and frequencies of waveform data of AC voltages output from the generators 1A and 1B coincide during parallel connection of the generators 1A and 1B and that frequencies of the waveform data coincide and phases thereof are shifted by 180° during series connection of the generators 1A and 1B. The aforesaid embodiment is adapted so as, during parallel connection of the generators 1A and 1B, to detect voltage waveform of a master generator (e.g., generator 1A) with the detector 16 of the slave generator (e.g., generator 1B) via lines L1 and L2, but the slave generator can instead acquire voltage waveform of the master generator via the communication lines.

The above embodiment can be combined as desired with one or more of the above modifications. The modifications can also be combined with one another.

As the present invention is configured to match the phases of voltage waveforms of the generators during parallel connection and shift the phases of the waveform data by 180° during series connection, multiple generators can be selectively operated in parallel connection and series connection in a state with their neutral lines grounded.

Above, while the present invention has been described with reference to the preferred embodiments thereof, it will be understood, by those skilled in the art, that various changes and modifications may be made thereto without departing from the scope of the appended claims.

What is claimed is:

1. A generator system, comprising:
    a first generator and a second generator each having an inverter circuit configured to output alternating current;
    a connection circuit configured to connect an output line for supplying electric power from the first generator and an output line for supplying electric power from the second generator to each other, and configured to connect a neutral line of the first generator and a neutral line of the second generator to the ground;
    a switch command unit configured to output a parallel connection command to switch a connection mode of the first generator and the second generator to a parallel connection mode, and configured to output a series connection command to switch the connection mode to a series connection mode;
    a circuit switch configured to switch a connection mode of the connection circuit to a first connection mode in which the first generator and the second generator are connected in the parallel connection mode when the parallel connection command is output by the switch command unit, and configured to switch the connection mode of the connection circuit to a second connection mode in which the first generator and the second generator are connected in the series connection mode when the series connection command is output by the switch command unit;
    a data acquiring unit configured to acquire a waveform data of alternating current voltage from the inverter circuit of the first generator when the second generator is operated after the first generator is operated; and
    a control unit configured to control operation of the inverter circuit of the second generator to synchronize a frequency and a phase of a waveform data of alternating current voltage from the inverter circuit of the second generator and the waveform data acquired by the data acquiring unit when the parallel connection command is output by the switch command unit, and configured to control operation of the inverter circuit of the second generator to synchronize the frequency and shift the phase of the waveform data of alternating current voltage from the inverter circuit of the second generator and the waveform data acquired by the data acquiring unit by 180 degrees when the series connection command is output by the switch command unit.

2. The generator system according to claim 1, wherein the connection circuit has
    a ground fault detector configured to detect a ground fault current, and
    an interrupter configured to interrupt an electric path from the first generator and the second generator to an electric load when the ground fault current is detected by the ground fault detector.

3. The generator system according to claim 2, wherein the neutral line of the first generator and the neutral line of the second generator are connected to each other and connected to the ground.

4. The generator system according to claim 1, further comprising:
    an operation switch box configured to be connected to the output line and the neutral line of the first generator and connected to the output line and the neutral line of the second generator, wherein
    the operation switch box further has the connection circuit, a parallel output terminal configured to be connected to the electric load in the parallel connection mode, and a series output terminal configured to be connected to the electric load in the series connection mode.

5. The generator system according to claim 4, wherein the operation switch box has
    a ground fault detector configured to detect a ground fault current, and
    an interrupter configured to interrupt an electric path from the first generator and the second generator to an electric load when the ground fault current is detected by the ground fault detector.

6. The generator system according to claim 4, wherein the control unit is a second generator control unit provided on the second generator,
    the first generator is provided with a first generator control unit configured to control operation of the inverter circuit of the first generator, and
    each of the first generator and the second generator is connected in the operation switch box to a communication line intercommunicably connecting the first generator control unit and the second generator control unit.

7. The generator system according to claim 6, wherein the operation switch box further has a switch unit configured to switch linked with switching operation of the circuit switch,
    the second generator is connected to a signal line connected to the switch unit, and the second generator control unit further configured to control operation of the inverter circuit based on a signal input through the signal line.

\* \* \* \* \*